(12) United States Patent
Dass et al.

(10) Patent No.: US 9,607,105 B1
(45) Date of Patent: Mar. 28, 2017

(54) CONTENT SEARCHING TECHNIQUES

(75) Inventors: Ramya Dass, Tamil Nadu (IN);
Manikandan Thangarathnam,
Chennai (IN)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/075,867

(22) Filed: Mar. 30, 2011

(51) Int. Cl.
*G06F 17/30* (2006.01)

(52) U.S. Cl.
CPC .............................. *G06F 17/30985* (2013.01)

(58) Field of Classification Search
None
See application file for complete search history.

(56) References Cited

U.S. PATENT DOCUMENTS

| | | | |
|---|---|---|---|
| 6,055,544 A * | 4/2000 | DeRose et al. | |
| 6,085,226 A * | 7/2000 | Horvitz | 709/203 |
| 6,963,871 B1 * | 11/2005 | Hermansen et al. | |
| 7,133,870 B1 * | 11/2006 | Tripp et al. | 707/723 |
| 7,433,893 B2 * | 10/2008 | Lowry | |
| 7,509,270 B1 * | 3/2009 | Hendricks | G06Q 30/02 |
| | | | 705/26.9 |
| 7,870,116 B2 * | 1/2011 | Olsen | H04L 67/1097 |
| | | | 707/705 |
| 8,073,695 B1 * | 12/2011 | Hendricks | G09B 5/065 |
| | | | 379/88.01 |
| 8,224,831 B2 * | 7/2012 | Rao | G06F 17/30153 |
| | | | 707/758 |
| 8,352,876 B2 * | 1/2013 | Batarseh | G06F 3/0483 |
| | | | 345/901 |
| 2002/0082939 A1 * | 6/2002 | Clark et al. | 705/26 |
| 2002/0152215 A1 * | 10/2002 | Clark et al. | 707/10 |
| 2002/0184189 A1 * | 12/2002 | Hay et al. | 707/1 |
| 2004/0030741 A1 * | 2/2004 | Wolton et al. | 709/202 |
| 2004/0198070 A1 * | 10/2004 | Xia et al. | 438/786 |
| 2005/0004889 A1 * | 1/2005 | Bailey et al. | 707/1 |
| 2005/0240580 A1 * | 10/2005 | Zamir et al. | 707/4 |
| 2006/0136391 A1 * | 6/2006 | Morris | 707/3 |
| 2006/0230340 A1 * | 10/2006 | Parsons et al. | 715/514 |
| 2006/0265358 A1 * | 11/2006 | Hara | G06F 17/30197 |
| 2007/0005616 A1 * | 1/2007 | Hay et al. | 707/100 |
| 2007/0005667 A1 * | 1/2007 | Yoshizawa | 707/203 |
| 2007/0022138 A1 * | 1/2007 | Erasani | G06F 11/0709 |
| 2007/0026371 A1 * | 2/2007 | Wood | 434/317 |
| 2008/0294674 A1 * | 11/2008 | Reztlaff et al. | 707/102 |
| 2009/0043740 A1 * | 2/2009 | Olsen | H04L 67/1097 |
| 2009/0063431 A1 * | 3/2009 | Erol et al. | 707/3 |
| 2009/0216774 A1 * | 8/2009 | Rao | G06F 17/30153 |

(Continued)

FOREIGN PATENT DOCUMENTS

WO    WO 2008/083316 A2 *    7/2008

*Primary Examiner* — Hung Le

(74) *Attorney, Agent, or Firm* — Lee & Hayes, PLLC

(57) ABSTRACT

Methods and systems of searching for text across platforms are usable to guide users to additional content for consumption. Search queries are based on text found within digital content and results are provided to indicate content from multiple different content items that contain the same or similar text. Cross-platform searches provide extensive breadth when a consumer is searching for similar information among a myriad of different sources. Additionally, search filtering may help provide more relevant results and search result weighting may provide prioritized lists of relevant content.

19 Claims, 6 Drawing Sheets

(56) References Cited

U.S. PATENT DOCUMENTS

| | | | |
|---|---|---|---|
| 2011/0231397 A1* | 9/2011 | Van Megchelen | 707/736 |
| 2012/0116979 A1* | 5/2012 | Hatch et al. | 705/80 |
| 2012/0123889 A1* | 5/2012 | Mosquera | 705/26.1 |
| 2012/0221936 A1* | 8/2012 | Patterson et al. | 715/230 |
| 2012/0259722 A1* | 10/2012 | Mikurak | 705/26.1 |
| 2013/0031643 A1* | 1/2013 | Rogel et al. | 726/29 |
| 2013/0067333 A1* | 3/2013 | Brenneman | 715/721 |
| 2013/0166471 A1* | 6/2013 | Fukuda Kelley et al. | 705/344 |
| 2013/0275559 A1* | 10/2013 | Bradley | 709/219 |
| 2015/0026176 A1* | 1/2015 | Bullock | G06F 17/3064 707/736 |

\* cited by examiner

CONTENT SEARCHING TECHNIQUES

BACKGROUND

A large and growing population of users is enjoying entertainment through the consumption of digital content items (or simply "content items"), such as electronic books (eBooks), periodicals, blogs, personal documents, and so on. The users employ various electronic devices to consume such content items. Among these electronic devices are eBook reader devices, cellular telephones, personal digital assistants (PDAs), portable media players, tablet computers, netbooks, and the like. As the quantity of available electronic media content continues to grow, along with increasing proliferation of devices to consume that media content, finding ways to enhance the searchability of the content and the user experience continues to be a priority.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
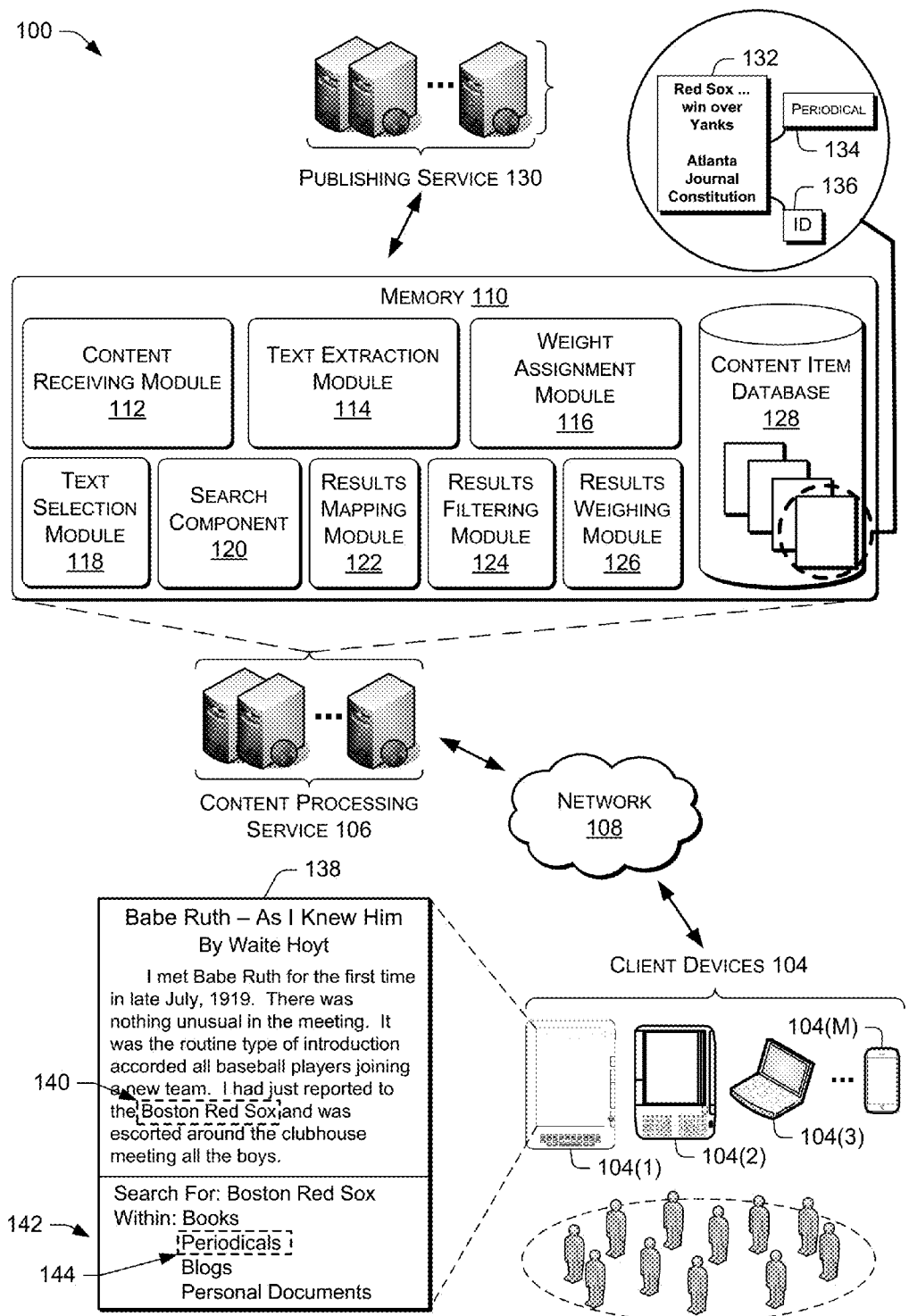
FIG. 1 illustrates an example architecture in which a community of users operates respective client devices to consume and search for content items, such as eBooks, periodicals, blogs, personal documents, and the like. In this architecture, a content processing service provides searchability of content items from multiple sources.

Embodiments of the present disclosure are directed to, among other things, enabling cross-platform content-searching of content items published to an electronic catalog. As an overview, a content item may be an eBook, a periodical, a blog, a personal document, or anything else that a computing device may present. An on-line merchant or content provider may receive content items from publishers, users, or other content providers. The merchant or content provider may then publish the content to a Web page by creating text samples, e.g., hypertext markup language (HTML) samples. Upon publishing the samples, the merchant or content provider may extract the textual or other content from the content item in order to prepare the textual content for indexing. In one example, a cross-platform content-searching service may index this textual content locally or it may provide the textual content to a third-party, or remote, searching platform. Once indexed, the textual content (regardless of its type or source) is searchable by a user.

Additionally, a user may provide a query term or phrase by typing with a physical keypad, typing using a virtual keypad on a touch-sensitive device, or selecting text based on a location of impact on a touch-sensitive device. Users may provide query terms or phrases from any platform. For example, a user may provide a query term to search through all available content items from an eBook reader device, a Web browser of a computing device, or an application of a mobile device, such as a cellular phone. The merchant, service, or device may then perform a search of indexed content based at least in part on the provided query term or phrase. In one example, the merchant, service, or device may perform the search. Alternatively, in some examples, the merchant, service, or device may provide the query term or phrase to a searching platform to perform the search. Further, a user may also indicate what type of content items should be searched within. For example, a user may request that the search service only search through physical books that have been scanned, electronic books, periodicals, or the like. Weights may also be provided such that a user may indicate a preference for search results where the query term or phrase is found within a title field, author field, or textual content of the content item. For instance, the search service, a publisher of a content item, or a user may request that a search result associated with a title be weighted more heavily than a search result associated with an author.

In each instance, the merchant, service, or device may then receive, or determine in the local searching example, a list of text strings that match or are otherwise associated with the submitted search query. Each text string may be associated with a respective content identifier (ID). Upon receiving the text strings, the merchant, service, or device may, in some instances, translate the IDs to specific content IDs such that the specific content IDs can identify the content item where the text string is located. The merchant, service, or device may then search the appropriate content items to determine in what portion of the content item the text string is located. Further, the merchant, service, or device may apply the assigned weights to prioritize the search results in a meaningful manner.

The discussion begins with a section entitled "Illustrative Architectures," which describes non-limiting environments in which a cross-platform content-providing service may be implemented to provide searching of content items from multiple different sources. Next, a section entitled "Illustrative User Interfaces," follows and describes examples of user interfaces (UIs) that the devices of the users of FIGS. 1 and 2 may serve and render. Finally, the discussion concludes with a section entitled "Illustrative Process," and a brief conclusion.

This brief introduction, including section titles and corresponding summaries, is provided for the reader's convenience and is not intended to limit the scope of the claims, nor the proceeding sections. Furthermore, the techniques described above and below may be implemented in a number of ways and in a number of contexts. Several example implementations and contexts are provided with reference to the following figures, as described below in more detail. However, the following implementations and contexts are but a few of many.

Illustrative Architecture

FIG. 1 illustrates an example architecture 100 in which a community of users 102 operates respective client devices 104(1), 104(2), 104(3), . . . , 104(M) to consume content items, such as eBooks, periodicals, blogs, personal documents, and the like. In this architecture, the client devices 104 and/or a content processing service 106 implement techniques to search for and provide requested information to the users based on a search query term provided by a requesting user.

The client devices 104 are variously configured with different functionality to enable consumption of one or more types of content items of any type or format including, for example, electronic texts (e.g., documents of any format, electronic periodicals, such as digital magazines and newspapers, etc.), digital audio (e.g., music, audible books, etc.), digital video (e.g., movies, television, short clips, etc.), images (e.g., art, photographs, etc.), and multi-media content. The terms "electronic book" and/or "eBook", as used herein, include electronic or digital representations of printed works, as well as digital content that may include text, multimedia, hypertext, and/or hypermedia. Examples of printed and/or digital works include, but are not limited to, books, magazines, newspapers, periodicals, journals, reference materials, telephone books, textbooks, anthologies, instruction manuals, proceedings of meetings, forms, directories, maps, web pages, etc.

FIG. 1 illustrates that the client devices 104 operated by users of the user community 102 may comprise eBook reader devices (e.g., devices 104(1) and 104(2)), laptop computers (e.g., device 104(3)), multifunction communication devices (e.g., device 104(M)), portable digital assistants (PDAs), wireless headsets, entertainment systems, portable media players, tablet computers, cameras, video cameras, netbooks, notebooks, desktop computers, gaming consoles, DVD players, media centers, or any other type of device.

In the architecture 100, the client devices 104 may receive, over a network 108, one or more content items for presentation on the devices 104 from the content processing service 106. The network 108 is representative of any one or a combination of multiple different types of public or private networks, such as the Internet, cable networks, cellular networks, wireless networks, and wired networks. One example of a wireless technology and associated protocols is the Wireless Fidelity (WiFi) wireless networking technologies defined according to IEEE 802.11 standards, while another example is a cellular network.

Figure 2:
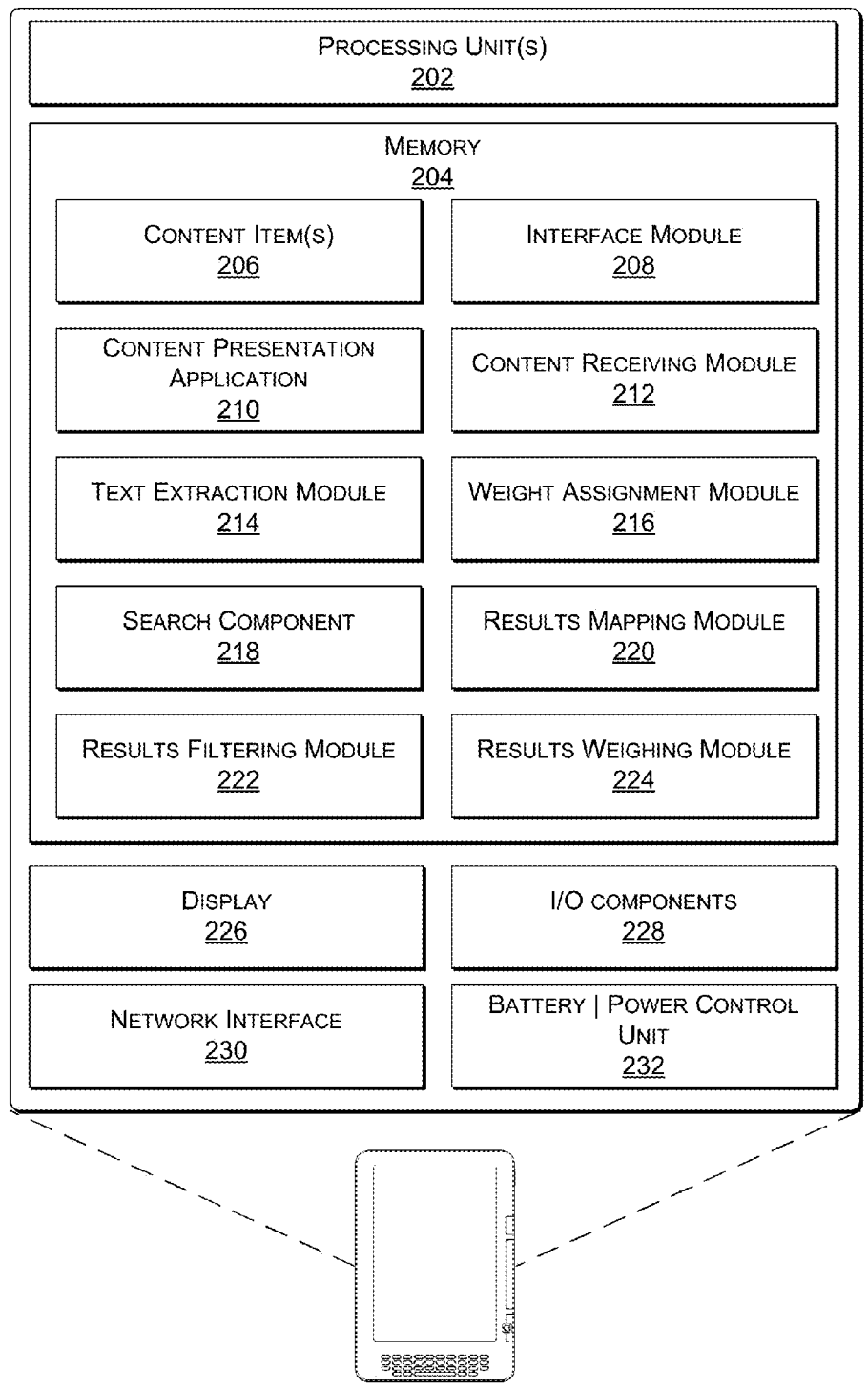
FIG. 2 illustrates a block diagram of example selected modules of an eBook reader device capable of receiving a request for information from a user consuming a content item and, in response, providing the information to the user based on several criteria.

As illustrated, the content processing service 106 is embodied as one or more servers that collectively have processing and storage capabilities to receive requests for content items from the devices 104, such as the eBook reader device 104(1). The servers of the content processing service 106 may be embodied in any number of ways, including as a single server, a cluster of servers, a server farm or data center, and so forth, although other server architectures (e.g., mainframe) may also be used. Alternatively, the content processing service 106 may be embodied as a client device, such as desktop computer, a laptop computer, an eBook reader device and so forth. In some implementations, for instance, some or all of the elements of content processing service 106 illustrated in FIG. 1 may reside on the client devices 104, as illustrated in FIG. 2.

In the illustrated example, the content processing service 106 includes memory 110 for storing a content receiving module 112, a text extraction module 114, a weight assignment module 116, a text selection module 118, a search component 120, a results mapping module 122, a results filtering module 124, and a results weighing module 126. The content processing service 106 may support distribution of content items (e.g., online retailing via a website) to the client devices 104. In some implementations, the servers of content processing service 106 store the content items locally, in a content item database 128, although in other implementations the servers merely facilitate purchase and delivery of content items stored in other locations.

The content receiving module 112, meanwhile, serves to receive content items from a publishing service 130, which may have received the content items from respective content sources. For instance, the content items received by the content receiving module 112 via the publisher service 130 may be from a book publisher, a personal computer, a periodical provider, an electronic book reader device, or from any other content source. Additionally, content items received by the content receiving module 112 may include a book, a periodical, a blog, and/or a personal document.

The text extraction module 114 serves to extract text from content items received from the publishing service 130 and create respective digital samples that may be used for searching inside in response to receiving future search queries. In one example, the text extraction module 114 may create a sample comprising an HTML file that contains the extracted text. The text extraction module 116 may then provide the extracted text (e.g., in the form of the digital sample) to the search component 120 for indexing. In one example, the search component 120 may index the text and store the text in association with each respective content item in the content item database 128. For instance, the content item 132, containing extracted text, may be stored in the content item database 128 along with an associated type 134 and ID 136 of the extracted text. As illustrated, content item 132 contains the extracted text, "Red Sox . . . win over Yanks," which includes the publisher name, "Atlanta Journal Constitution." Other text not shown, however, may also be contained in the content item 132.

In some instances, the module 114 extracts content from the content items that has been approved, by respective publishers of the content items, for providing as a search result to the client devices 104. For instance, publishers may allow the content processing service 106 (and other merchants) to allow users to sample and receive portions of their respective content items, but less than all of these content items. As such, the module 114 may extract text from the approved content, but not from content that has not been approved. In other embodiments, meanwhile, the text extraction module 114 may extract and provide text from an entire content item, while limiting which results are provided back to the client devices. That is, the content processing service 106 may extract all of the text from a particular content item, but may only return—in response to a search request—portions of the content item that have been approved by the publisher of the content item(s) or other rights holder(s).

Additionally, in one non-limiting example, a user of the user community 102 may operate the eBook reader device 104(1), which displays eBook 138 entitled, "Babe Ruth—As I Knew Him." In reading the eBook, the user may come across a reference to the Boston Red Sox and may become interested in reading more about the baseball team. In this example, the user may select the phrase "Boston Red Sox" 140 by touching the display screen of device 104(1) or by typing the phrase with physical keys of the device. Additionally, in one example, by selecting the phrase 140, a user interface 142 of the device 104(1) may present searching options to the user. For instance, the user interface 142 may allow the user to select a type of content item to search within (e.g., periodicals, blogs, etc.). As illustrated at 144, the user in this example has selected to search for "Boston Red Sox" within periodicals. The users of the user community 102 may select and submit search queries in any way (e.g., by highlighting text, orally speaking a command to a microphone of the device, inputting the command on a keyboard, etc.).

Furthermore, the text selection module 118 of the content processing service 106 may receive this information and provide the search query phrase, in this case "Boston Red Sox," to the search component 120. Additionally, in this example, the search component 120 may determine that the phrase "Red Sox," appears in the content item 132 of the content item database 128 (potentially among multiple other content items stored in the database 128). Once this is determined, the search component 120 may return search results containing at least content item 132 along with the associated ID 136. Additionally, the search results may contain additional content items.

The results mapping module 122 of content processing service 106 may then map the results, which may include mapping the ID 136 to a particular ID of the content item 132 that represents the entire content item as opposed to extracted text content item 128 of content item database. In other words, the content item 132 with extracted text is mapped to the content item that was originally received by the content receiving module 112 of the content processing service 106. Thus, the search results may now be a list of mapped content items, or a mapped list. In other instances, meanwhile, the ID 136 associated with the extracted text may be the same ID as the underlying content item and, as such, the mapping comprises mapping the extracted text to the associated content item using the same ID.

The results filtering module 124 may then filter the mapped list. In this example, because the user selected to search within periodicals, only periodicals will remain in the mapped list. All other types of content items may be filtered out of the mapped list by the results filtering module 124. Finally, the results weighing module 126 may prioritize the mapped list that has been filtered.

In some examples, the results weighing module 126 may weigh content items based on weights that have been assigned by the weight assignment module 116. In some instances, the weight assignment module 116 may assign weights (or "boost values") based on what portion of the content item the search query phrase or term was located. These weights may be preset by the content processing service 106, may be set by a user conducting a particular search, may be set by publishers of the content items, and/or may be set by any other entities. In one example, the weight assignment module 116 may universally assign higher weights to matches in a title than matches in a body of a content item. For instance, when the publishing service 130 publishes a particular content item to the content processing service 106, the module 116 may assign a certain weight to the title, a certain weight to the body, and/or certain weights to other portions of metadata.

As such, in the illustrated example, the results weighing module 126 may weight a content item having "Boston Red Sox" in the title higher than a content item having "Boston Red Sox" in the body of the content item. Alternatively, or in addition, the results weighing module 126 may weigh content items based on a relevance score between the identified term or phrase and the search query term or phrase.

Figure 5:
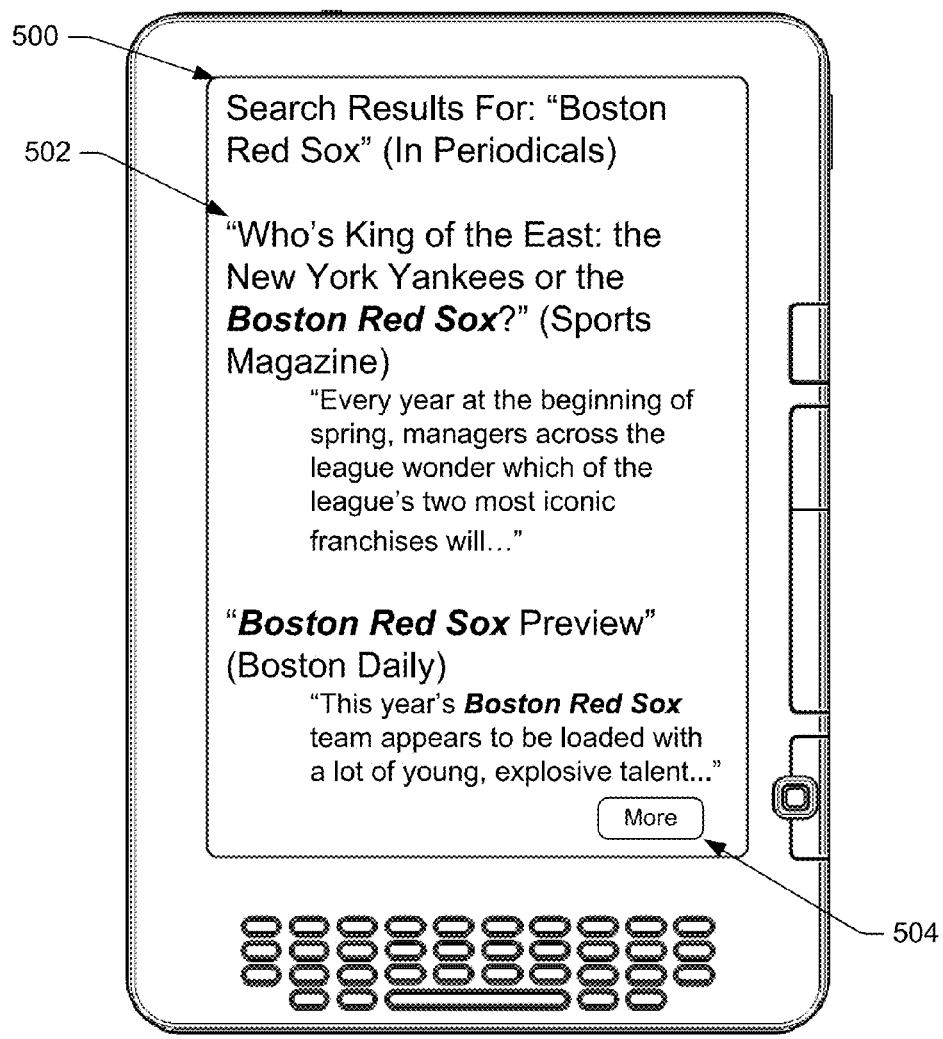
FIG. 5 illustrates an example user interface rendered by the device of FIGS. 3 and 4 after a user of the device chooses to search for "Boston Red Sox" for the currently-displayed eBook. As illustrated, search results having this selected text in the title are weighted more heavily (and, hence, appear nearer the top of the results) than are results having this selected text in the body of the content item.

Once the results weighing module 126 has ranked the list of content items based on the weights assigned by the weight assignment module 116, the content processing service 106 may serve the ordered results to the client device. These results may include portions of the extracted text that publishers of the respective content items have indicated as permissible to provide as samples. As such, the client device 104(1) that submitted the search query "Boston Red Sox" may receive and render a search-results UI that includes portions of the content item 132, possibly in addition to other content items matching this query. FIG. 5 illustrates such an example UI in greater detail.

While FIG. 1 illustrates that the content processing service 106 includes the described collection of components, in other instances these components may reside across multiple different entities. For instance, the search component 120 and other select modules described may be implemented as a self-contained search service that communicates with the content processing service 106 and one or more other entities that desire to utilize the search service. Furthermore, in other embodiments, some or all of the modules including the search component 120 may reside on the client device itself.

FIG. 2, for instance, illustrates example components that might be implemented in the eBook reader device 104(1) of FIG. 1 that displays content items, such as eBooks, blogs, periodicals, personal documents, or the like. In this example, the eBook reader device 104(1) is a dedicated, handheld eBook reader device, although other electronic devices may implement these techniques and, hence, may include some of the functionality described herein.

In a very basic configuration, the eBook reader device 104(1) includes one or more processing units 202 and memory 204. Depending on the configuration of a dedicated eBook reader device 104(1), the memory 204 (and other memories described throughout this document) is an example of computer storage media and may include volatile and nonvolatile memory. Thus, the memory 204 may include, but is not limited to, RAM, ROM, EEPROM, flash memory, or other memory technology, or any other medium which can be used to store media items or applications and data which can be accessed by the eBook reader device 104(1).

The memory 204 may be used to store any number of functional components that are executable on the processing unit(s) 202, as well as data and content items that are rendered by the eBook reader device 104(1). Thus, the memory 204 may store an operating system and an eBook storage database to store one or more content items 206, such as eBooks, blogs, periodicals, audio books, songs, videos, still images, and the like. The memory 204 may further include a memory portion designated as an immediate page memory to temporarily store one or more pages of an electronic book. The pages held by the immediate page memory are placed therein for a short period before a next page request is expected.

The term "page," as used herein, refers to a collection of content that is presented at one time in a display of the eBook reader device 104(1). Thus, a "page" may be understood as a virtual frame of the content, or a visual display window presenting the content to the user. Thus, "pages" as described herein are not fixed permanently, in contrast to the pages of published "hard" books. Instead, pages described herein may be redefined or repaginated when, for example, the user chooses a different font for displaying the content in the first display. In addition to pages, the terms "page views", "screen views", and the like are also intended to mean a virtual frame of content.

An interface module 208 may also be provided in memory 204 and may be executed on the processing unit(s) 202 to provide for user operation of the device 104(1). One feature of the interface module 208 allows a user to request to receive information from a reference work regarding a word, phrase, or topic found within one of the content items 206. For instance, the interface module 208 may allow the user to request a definition of a word from a dictionary, synonyms from a thesaurus, a map from an atlas, and the like. Additionally, the interface module 208 may allow the user to request additional content items that contain terms or phrases found in the viewed or locally stored content items 206. As such, the interface module 208 may receive a selection of text that a user desires to search for, similar to how the text selection module 118 of FIG. 1 may receive these text selections.

The interface module 208 may facilitate textual entry of request (e.g., via a cursor, controller, keyboard, etc.), audible entry of the request (e.g., via a microphone), or entry of the request in any other manner. The interface module 208 may provide menus and other navigational tools to facilitate selection and rendering of the content items 206. The interface module 208 may further include a browser or other application that facilitates access to sites over a network, such as websites or online merchants.

A content presentation application 210 may render the content items 206. The content presentation application 210 may be implemented as various applications depending upon the content items. For instance, the application 210 may be an electronic book reader application for rending electronic books, or an audio player for playing audio books or songs, or a video player for playing video, and so forth.

FIG. 2 further illustrates that the memory 204 stores a content receiving module 212 that is executable on the processing unit(s) 202 to receive content items from multiple different types of sources (e.g., via the publishing service 130). As discussed above, textual information from the content items may be extracted from the content items for indexing and/or cataloging.

The eBook reader device 104(1) may also store, in some instances, a text extraction module 214 that is executable on the processing unit(s) 202 to allow for extracting and/or indexing of the extracted text of each received content item. In one example, the text extraction module 214 catalogues the extracted text from each respective content item along with an associated ID. Of course, and as described above with reference to FIG. 1, this module (and multiple other modules illustrated in FIG. 2) may instead reside on the content processing service.

The eBook reader device 104(1) may also store a weight assignment module 216 that is executable on the processing unit(s) 202 to allow a user to set desired weights to use when conducting a search for a particular piece of text (e.g., as discussed above with reference to the weight assignment module 116 of FIG. 1). For instance, in one example, the user may desire to heavily weight content items having a title that matches a particular search query, an author that matches the query, or the like.

FIG. 2 further illustrates that the memory 204 may also store a search component 218 that is executable on the processing unit(s) 202 to search the extracted and catalogued textual information associated with each content item. Additionally, as described above with reference to FIG. 1, the memory 204 may also store a results mapping module 220, a results filtering module 222, and a results weighing module 224 that are each executable on the processing unit(s) 202 to map the search results to actual content items that can be rendered, filter the mapped results based on filtering criteria provided by the user, and prioritize the filtered list based on weight criteria provided by the user. In some examples, however, the filtering and weighing criteria may not be provided by the users at all. In this case, the pre-defined filtering, weighing, and other criteria may be used to further enhance the search results.

FIG. 2 further illustrates that the eBook reader device 104(1) may include a display 226, which may be passive, emissive or any other form of display. In one implementation, the display uses electronic paper (ePaper) display technology, which is bi-stable, meaning that it is capable of holding text or other rendered images even when very little or no power is supplied to the display. Some example ePaper-like displays that may be used with the implementations described herein include bi-stable LCDs, MEMS, cholesteric, pigmented electrophoretic, and others. In other implementations, or for other types of devices, the display may be embodied using other technologies, such as LCDs and OLEDs, and may further include a touch screen interface. In some implementations, a touch sensitive mechanism may be included with the display to form a touch-screen display.

The eBook reader device 104(1) may further be equipped with various input/output (I/O) components 228. Such components may include various user interface controls (e.g., buttons, a joystick, a keyboard, etc.), audio speakers, connection ports, and so forth.

A network interface 230 supports both wired and wireless connection to various networks, such as cellular networks, radio, WiFi networks, short range networks (e.g., Bluetooth), IR, and so forth. The network interface 230 may allow a user of the device 104(1) to download content items from the content processing service 106, and the like.

The eBook reader device 104(1) also includes a battery and power control unit 232. The battery and power control unit 232 operatively controls an amount of power, or electrical energy, consumed by the eBook reader device. Actively controlling the amount of power consumed by the reader device may achieve more efficient use of electrical energy stored by the battery.

The eBook reader device 104(1) may have additional features or functionality. For example, the eBook reader device 104(1) may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data.

Various instructions, methods and techniques described herein may be considered in the general context of computer-executable instructions, such as program modules, executed by one or more computers or other devices. Generally, program modules include routines, programs, objects, components, data structures, etc. for performing particular tasks or implementing particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on or transmitted across some form of computer readable media.

Illustrative User Interfaces

Figure 3:
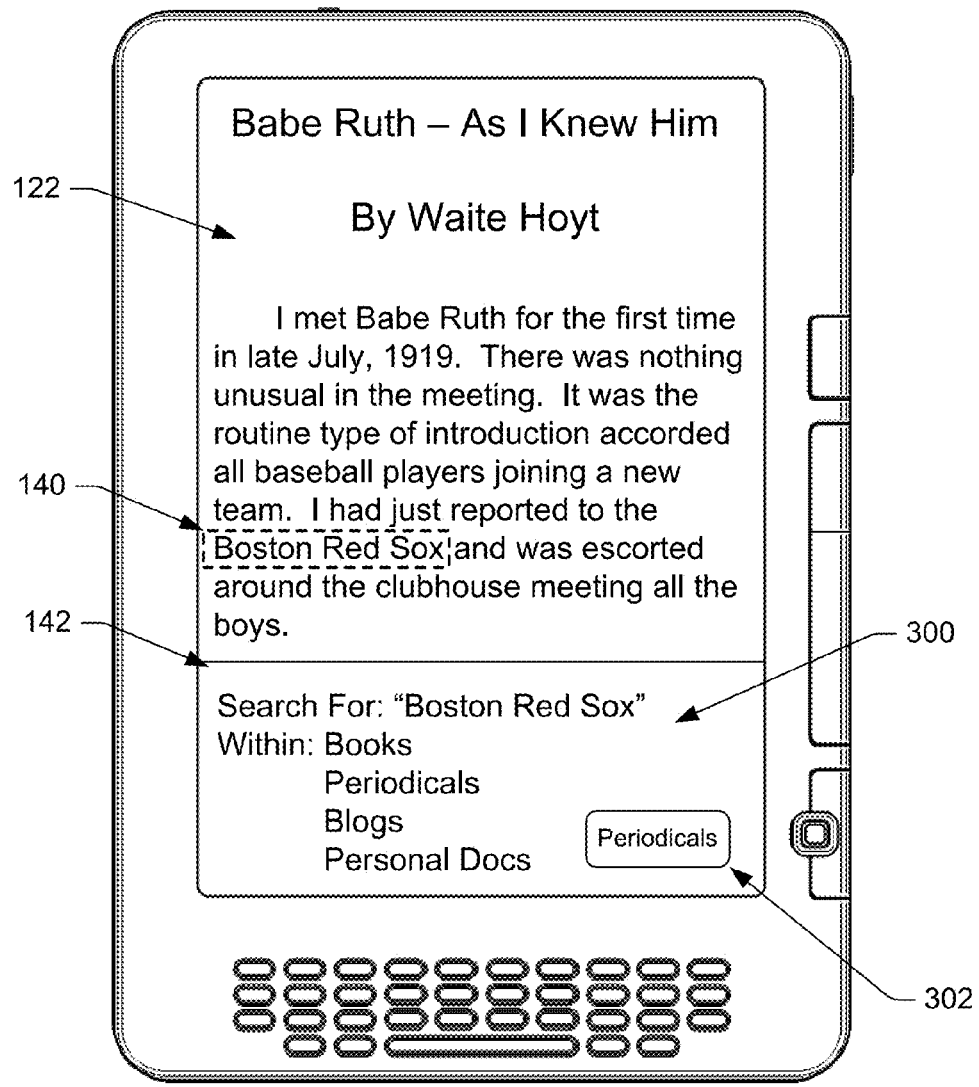
FIG. 3 illustrates an example user interface rendered by the devices of FIGS. 1-2. Here, the device or the content-processing service has determined that a user has selected "Boston Red Sox" from the text of the eBook currently displayed. As such, the device or the service may provide options for a type of content to search within.
Figure 4:
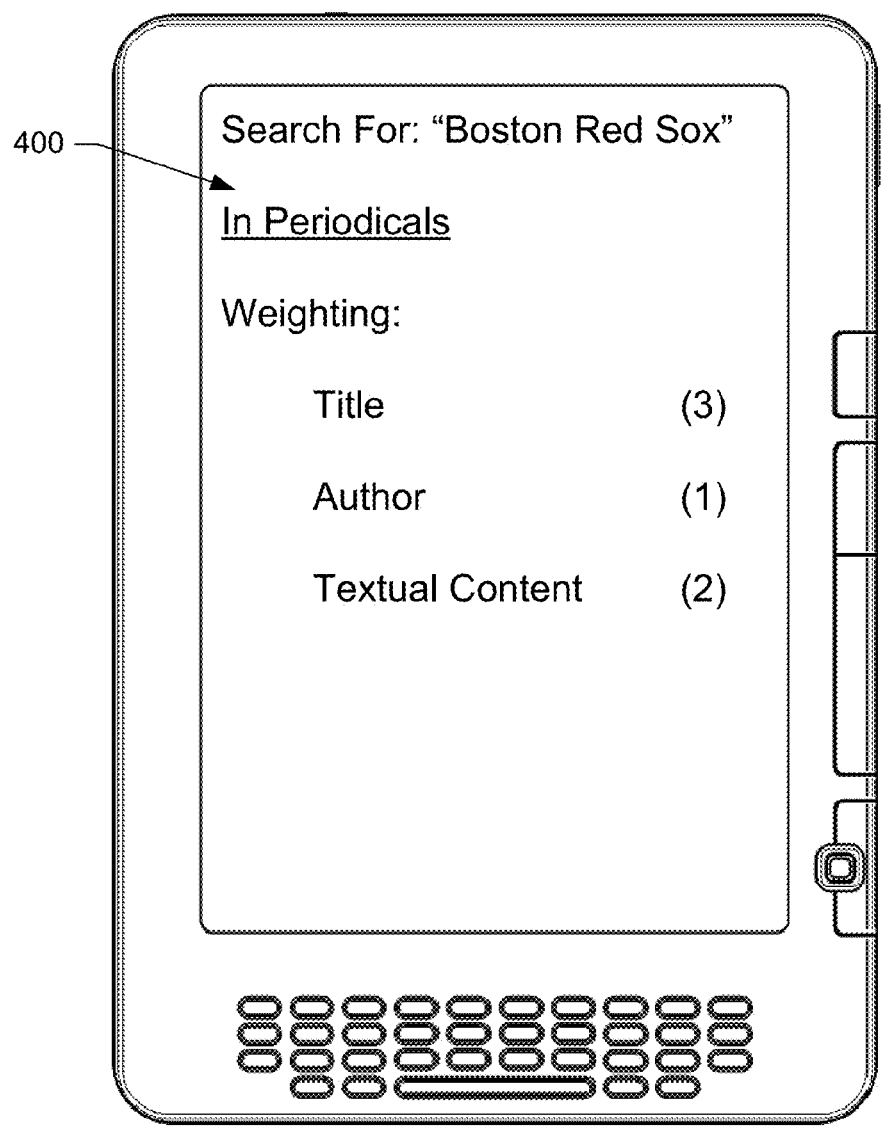
FIG. 4 illustrates an additional example user interface rendered by the devices of FIGS. 1-3. Here, the user is able to select a value of weights to apply when determining importance of what portion of a book or eBook the user would like to search within.

FIGS. 3-5 illustrate example user interfaces that the eBook reader device 104(1) (and the other client devices of the architecture 100) may render in accordance with the techniques described above. While these figures illustrates a few example interfaces it is to be appreciated that numerous other types of interfaces displaying information from numerous other types of reference works may be implemented using the described techniques.

FIG. 3 illustrates the example user interface described above with reference to FIG. 1. Here, the user has selected (e.g., via a keyboard, cursor, touch screen, etc.) the phrase "Boston Red Sox" 300 as illustrated by the highlight 140. As such, the user interface displays search filtering options at interface 142. Additionally, an indication 302 displays that in this example, the user has selected "Periodicals" as the intended search filter. That is, while reading a particular content item, the user has requested to view portions of other content items that also include or are otherwise associated with the phrase "Boston Red Sox." More specifically, in this example, the user requested to view periodicals that include or are otherwise associated with this phrase.

FIG. 4 illustrates an example user interface rendered by the eBook reader device 104(1) after the user has selected the search phrase, "Boston Red Sox," and the search filter of "Periodicals." As shown, in response the device displays an interface 400 for allowing the user to assign weights to particular portions of the content item. Here, the user may decide to give more or less weight to finding the search phrase within the title field, the author field, or within the textual content of the content item. In this example, the user has selected to give the most weight to finding the phrase "Boston Red Sox," within the title of available periodicals and the least weight to finding the phrase within the author field of available periodicals. As discussed above, however, in some instances these weights may be preset by the content processing service 106 without input from the user. Instead, the content processing service 106, content-item publishers, and/or other entities may define the value of these weights.

FIG. 5 illustrates an example user interface 500 that the content processing service 106 may serve to the eBook reader device 104(1), regardless of whether the user, the service 106, or another entity has set the weights associated with the searching. Here, the UI 500 includes results that have been filtered to include periodicals, without other types of content items, as selected by the user via the example UI of FIG. 3.

Furthermore, in this instance, the UI illustrates search results 502 in the form of a ranked list of content items. Here, content items having the search query "Boston Red Sox" in their titles are weighted more heavily than content items having the query in the body of the content item, or in another location. As such, the top two illustrated content items both have the phrase "Boston Red Sox" in their respective titles, while content items further down the list may have this phrase in their body but not in the title. As illustrated, the UI 500 includes an icon 504 ("More") that, when selected, causes the device 104(1) to render a UI having additional results that are ranked lower than the content items illustrated in FIG. 5.

Of course, while a few examples have been given, it is to be appreciated that the techniques may allow the user to weight any other different portion of a content item. For example, the user may be able to weight the finding of a search query in a particular chapter, on a particular page, or the like.

Illustrative Processes

Figure 6:
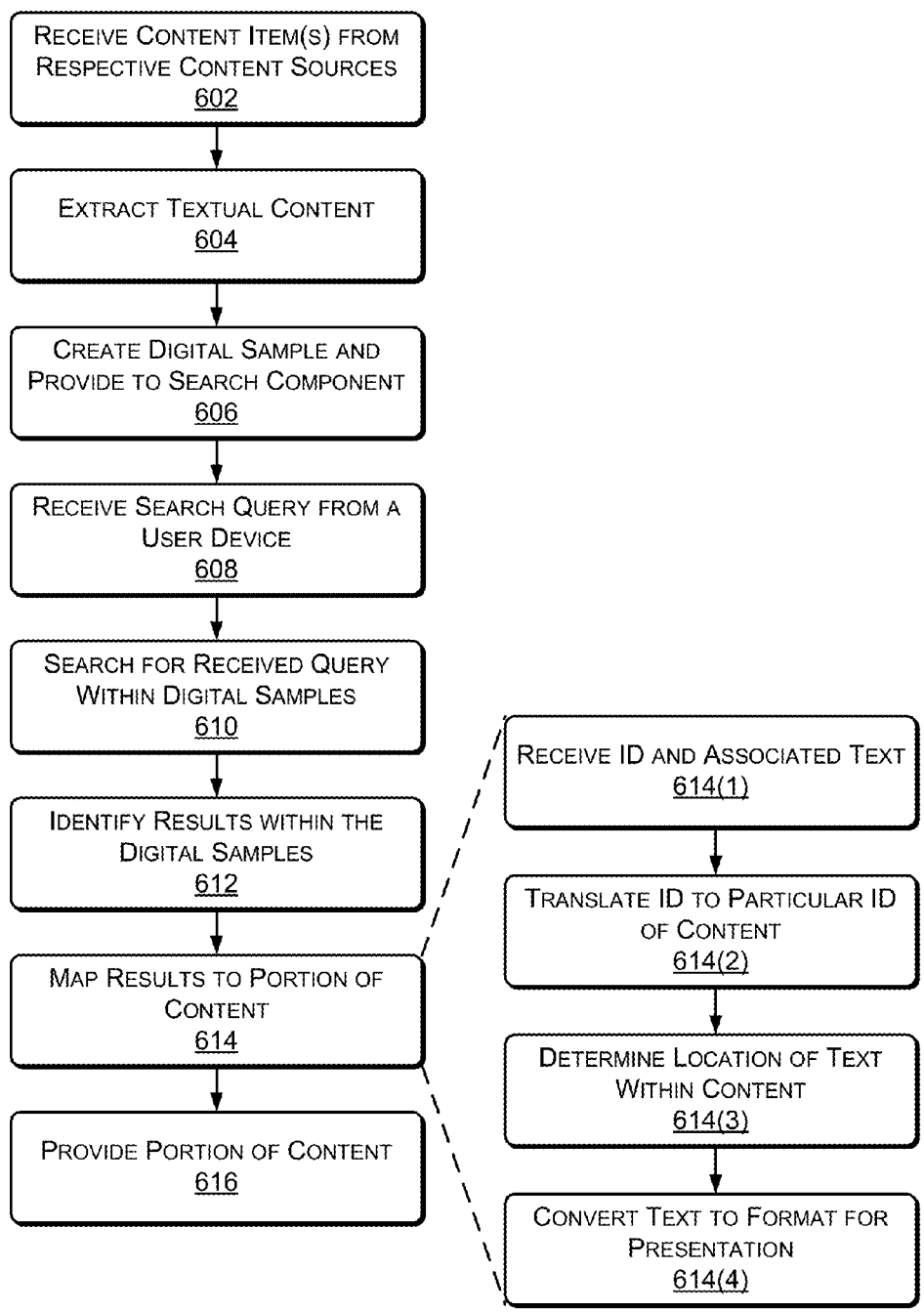
FIG. 6 is a flow diagram of an example embodiment of a process for performing content searching using the described techniques.

FIG. 6 illustrates an example process 600 for implementing the techniques described above for providing related items based on a search of content items from multiple different sources. This process is illustrated as a logical flow graph, each operation of which represents a sequence of operations that can be implemented in hardware, software, or a combination thereof. In the context of software, the operations represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

For discussion purposes, the process 600 is described with reference to the architecture 100 of FIG. 1, although other architectures may implement this process.

Process 600 includes an operation 602, which represents receiving content items associated with one or more different content sources, such as one or more sources above. In some instances, the content items are received via the publishing service 130. After receiving the content item, an operation 604 represents extracting textual content (e.g., HTML text) from the content item. Next, an operation 606 represents creating a digital sample of the content item from the extracted textual content. This digital sample may be provided to a search component (e.g., the search component 120) for indexing or cataloging, which may reside locally or as a portion of a remote search service.

Operation 608, meanwhile, represents receiving a search query from a user operating a user device. For instance, as noted above, a user may highlight or otherwise select a term or a phrase for which to be searched. Next, an operation 610 represents providing the search query, made up of the selected phrase or term, to the search component for determining if matches occur within the indexed textual content.

Operation 612 represents receiving search results from the search component based on the search query from the user. In one example, the received search results may include a list of strings with associated IDs. In one example, these associated IDs may be assigned by the search component and may not be directly associated with the content item from which the text of the search results came. Further, operation 614 represents mapping the search results to a portion of a content item. That is, the ID assigned by the search service may be mapped to a respective content item ID that is directly associated with the content item. In some instances, these IDs may comprise the same ID. In some instances, this mapping may include one or more of a combination of sub-operations 614(1), 614(2), 614(3), and 614(4).

Sub-operation 614(1) represents receiving the text string and the associated ID. As noted above, this associated ID may or may not directly identify the content item with which the text string belongs. As such, sub-operation 614(2) represents, in some instances, translating the received ID to a particular ID of available content stored in the content item database 128. In other words, the translation may involve mapping the received ID, which may be assigned to the text string by the search service, to a particular ID that directly identifies the content item. An example of a particular ID that directly identifies a content item is an International Standard Book Number (ISBN), that is assigned to each content item.

Additionally, sub-operation 614(3) represents determining a location of the text string within the translated (or mapped) content. In one example, this sub-operation may determine that a text string is located within the title portion of a book with a particular ISBN. That is, once the translation is complete, and the particular content item is identified, a location where the text string exists may be identified. Then, sub-operation 614(4) represents converting the appropriate text (i.e., the text that matches the search query) to a format that can be presented on the user device. In other words, based on the user device, sub-operation 614(4) may convert the search results to one or more different formats. For example, the search results may be converted to HTML if the user device displays Web pages. Alternatively, the sub-operation 614(4) may represent converting the search results to an eBook when the user device is an eBook reader. Further, once the sub-operations of operation 614 are completed, the user device or server may provide the portion of content to the user, represented by operation 616.

CONCLUSION

Although embodiments have been described in language specific to structural features and/or methodological acts, it is to be understood that the disclosure is not necessarily limited to the specific features or acts described. Rather, the specific features and acts are disclosed as illustrative forms of implementing the embodiments.

What is claimed is:

1. A method comprising:
under control of one or more computing systems configured with specific executable instructions:
receiving a content item associated with a content source, the content item including one or more approved portions that have been approved by a publisher for providing as a search result;
identifying the one or more approved portions of an electronic book;
extracting the one or more approved portions from the content item received from the content source to form extracted textual content;
creating a digital sample for the content item, wherein the digital sample includes the extracted textual content from the content item, a type associated with the content item and a content item identifier that identifies the content item;
receiving a search query from a client computing device;
searching for the search query within the digital sample;
identifying search results within the digital sample associated with the search query based at least in part on the searching;
mapping the search results to a portion of the content item received from the content source, wherein the mapping the search results to the portion of the content item comprises:
receiving a results identifier associated with the search results, and an associated text string;
mapping the results identifier to the content item identifier;
determining a location of the associated text string from within the content item based at least in part on the results identifier; and
converting the associated text string to a format for presentation on the client computing device; and
providing the portion of the content items to the client computing device.

2. The method of claim 1, wherein the receiving the search query from the client computing device further comprises receiving, from the client computing device, a preference for search results within a particular section of the content item, and assigning a weight to the particular section based at least in part on the preference.

3. The method of claim 2, further comprising prioritizing the search results based at least in part on the weight assigned to the particular section.

4. The method of claim 1, wherein the converting the associated text string to the format for presentation on the client computing device further comprises converting the associated text string to at least one of hypertext markup language (HTML) text format or an eBook format.

5. One or more non-transitory computer-readable media storing computer-executable instructions that, when executed by one or more processors, configure the one or more processors to perform acts comprising:
receiving an electronic book associated with a publisher;
identifying one or more approved portions of the electronic book that have been approved by the publisher for providing as a search result;
extracting the one or more approved portions of the electronic book to form extracted text;
creating a digital sample for the electronic book, wherein the digital sample includes the extracted text and an electronic-book identifier that identifies the electronic book;
receiving a search query from a user device;
identifying a search result associated with the search query;
associating the search result with the digital sample of the electronic book, wherein the associating comprises:
determining, from the search result, a results identifier and an associated text string;
associating the results identifier with the electronic-book identifier;
determining a location of the associated text string from the electronic book based at least in part on the results identifier; and
converting the associated text string to a format for presentation on the user device; and
providing the digital sample that includes the extracted text to the user device.

6. The one or more non-transitory computer-readable media of claim 5, wherein the publisher comprises at least one of a periodical provider, an author, or a publishing house.

7. The one or more non-transitory computer-readable media of claim 5, wherein the digital sample comprises hypertext markup language (HTML) text.

8. The one or more non-transitory computer-readable media of claim 5, wherein the providing of the digital sample comprises providing the one or more approved portions that are approved by the publisher while refraining from providing additional text that has been extracted but has not been identified as being approved for providing as a search result from a publisher.

9. The one or more non-transitory computer-readable media of claim 5, wherein the receiving the search query from the user device comprises receiving the search query from an electronic book reader device.

10. The one or more non-transitory computer-readable media of claim 9, wherein the receiving the search query comprises receiving a selection of text from the electronic book being displayed on the electronic book reader device.

11. A system comprising:
one or more processors;
memory accessible by the one or more processors;
a content receiving module, stored in the memory and executable on the one or more processors, to receive a content item associated with a content source, the content item including one or more approved portions that have been approved by a publisher for providing as a search result;
a text extraction module, stored in the memory and executable on the one or more processors, to identifying one or more approved portions of an electronic book that have been approved by the publisher for providing as a search result, extract the one or more approved portions from the content item received from the content source to form extracted textual content, and create a digital sample for the content item, wherein the digital sample includes the extracted textual content from the content item, an indication of a type of the content item and a content item identifier that identifies the content item;
a text selection module, stored in the memory and executable on the one or more processors, to receive an indication that indicates that a user has selected text displayed via a display device of a computing device;
a search component, stored in the memory and executable on the one or more processors, to search for the selected text within the digital sample;
a result mapping module, stored in the memory and executable on the one or more processors, to receive search results obtained by the search component that includes a results identifier associated with the search results, and an associated text string, map the results identifier to the content item identifier, determine a location of the associated text string from within the content item based at least in part on the results identifier, and convert the associated text string to a format for presentation; and
a service module stored in the memory and executable on the one or more processors, to provide the associated text string to the computing device.

12. The system of claim 11, further comprising a results filtering module, stored in the memory and executable on the one or more processors, to receive filtering criteria indicating a type of the content item in which to search for the selected text.

13. The system of claim 11, wherein the search component is further executable to obtain search results based at least in part on the searching for the selected text.

14. The system of claim 11, further comprising:
a weight assignment module, stored in the memory and executable on the one or more processors, to assign a weight the search results obtained by the search component based at least in part on a location within the content item at which the selected text is found; and
a results weighing module, stored in the memory and executable on the one or more processors, to prioritize the search results obtained by the search component based at least in part on the weight assigned to each search result.

15. The system of claim of 11, wherein the type of the content item to search within comprises at least one of an electronic book, a periodical, a blog, a personal document.

16. The system of claim of 11, wherein the publisher comprises at least one of a periodical provider, an author, or a publishing house.

17. One or more non-transitory computer-readable media storing computer-executable instructions that, when executed by one or more processors, configure the one or more processors to perform acts comprising:
receiving a content item, the content item including one or more approved portions that have been approved by a publisher for providing as a search result;
identifying the one or more approved portions that have been approved by the publisher for providing as a search result;
extracting the one or more approved portions from the content item to form extracted textual content;
creating a digital sample for the content item, wherein the digital sample includes the extracted textual content from the content item, an indication of a type of the content item, and a content item identifier that identifies the content item;
receiving a selection of text;
searching for the selection of text within the digital sample;
determining that the selection of text exists within the digital sample and is associated with a results identifier;
mapping the digital sample to a portion of the content item, wherein the mapping the digital sample to the portion of the content item comprises:
  mapping the results identifier to the content item identifier;
  determining a location of an associated text string from within the content item based at least in part on the results identifier; and
  converting the associated text string to a format for presentation on a client computing device; and
providing the associated text string to the client computing device.

18. The one or more non-transitory computer-readable media of claim 17, wherein the type of the content item to search within comprises at least one of an electronic book, a periodical, a blog, or a personal document.

19. The one or more non-transitory computer-readable media of claim 17, wherein the converting the associated text string to the format for presentation on the client computing device comprises converting the associated text string to at least one of hypertext markup language (HTML) text format or an eBook format.

* * * * *